United States Patent [19]
Fletcher et al.

[11] 3,855,873
[45] Dec. 24, 1974

[54] GENEVA MECHANISM

[76] Inventors: James C. Fletcher, Administrator of the National Aeronautics and Space Administration with respect of an invention of; Robert H. Summers; Ralph L. Kenney, both of Pasadena, Calif.

[22] Filed: Nov. 2, 1973

[21] Appl. No.: 412,079

[52] U.S. Cl. .................................... 74/436, 74/820
[51] Int. Cl. ....................... F16h 55/04, B23q 17/02
[58] Field of Search ............................. 74/820, 436

[56] References Cited
UNITED STATES PATENTS
2,789,441    4/1957    Thorburn............................. 74/436

Primary Examiner—Leonard H. Gerin
Attorney, Agent, or Firm—Wilfred Grifka; Monte F. Mott; John R. Manning

[57]    ABSTRACT

An improved Geneva mechanism characterized by a driven star-wheel having a segmented cam-follower surface and a star-wheel driver including a restraining cam having a segmented cam surface for engaging the cam-follower surface of the star-wheel and anti-friction rollers pinned to the restraining cam for engaging the cam-follower surface of the star-wheel.

4 Claims, 6 Drawing Figures

PATENTED DEC 24 1974

3,855,873

GENEVA MECHANISM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention:

The invention relates generally to a Geneva mechanism and more specifically to an improved Geneva mechanism including a star-wheel and a driver particularly suited for intermittently advancing a load in the direction in which the load is applied.

2. Description of the Prior Art:

The prior art, of course, includes Geneva mechanisms of numerous types. The basic purpose of such mechanisms is to convert uniform rotary motion to incremental angular motion. Frequently, such a mechanism includes a star-wheel having a plurality of radially extended slots and a cam-follower surface including a plurality of uniformly dimensioned and similar configured segments interposed between the slots. A star-wheel driver, including an arm affixed at its base and having a stubshaft disposed at its distal end, is employed for indexing the star-wheel. As is well recognized by those familiar with such mechanisms, a restraining cam having a cam surface including an excurvated surface configured to mate with the incurvated surfaces of the star-wheel, often is provided in coaxial alignment with the arm for purposes of restraining the star-wheel from rotary motion except during the periods in which the star-wheel is driven by the arm. Of course, the star-wheel must be restrained only intermittently and in a manner such that the slots sequentially receive the stub-shaft.

Normally, the star-wheel is loaded and thus biased in a direction opposite to that in which the star-wheel is driven or indexed by the star-wheel driver. In such instances, the effects of sliding friction established between the cam surface of the restraining cam and the cam-follower surface of the star-wheel is negligible. However, it has been found that where the star-wheel is loaded and thus biased for rotation in the same direction that it is indexed by the driver, there is a definite tendency for the restraining cam and star-wheel to "freeze" together. This effect results from the fact that in order to accommodate rotation of the star-wheel, the restraining cam normally is provided with an incurvated segment having a length of 90° extended between the ends of an excurvated segment having a length of 270°.

It should be apparent that as the incurvated surface segment of the cam surface faces the projected portion of the star-wheel, the star-wheel is released for rotation under the influence of the applied load. Thus there is a propensity for the star-wheel to "follow" the restraining cam. This, in turn, causes the star-wheel to "overrun" the restraining cam, or advance in a manner such that point-contact is established between the cam-follower surface and the cam surface of the restraining cam, near the intersection of the excurvated segment with the incurvated segment of the cam surface. Of course, unless relative motion between these surfaces at the point of contact is provided for, continued rotation of the restraining cam merely increases the stress developed between the contiguous surfaces so that the cam and star-wheel are, in effect, frozen together.

It should, therefore, readily be appreciated that there currently exists a need for an improved Geneva mechanism which can be employed for driving a star-wheel with indexing motion particularly in instances where the star-wheel is continuously biased for rotation in a direction in which it is driven or indexed by the star-wheel driver.

Therefore, it is a purpose of the instant invention to provide a Geneva mechanism which can be employed in incrementally advancing a load in the same direction in which it is applied, without sacrificing any of the advantages which normally attend a use of a Geneva mechanism.

OBJECTS AND SUMMARY OF THE INVENTION

It is therefore an object of the instant invention to provide an improved Geneva mechanism.

It is another object to provide an improved Geneva mechanism capable of incrementally advancing a loaded star-wheel in the direction of the applied load.

It is another object to provide an improved Geneva mechanism of a type including a driven star-wheel, a star-wheel driver having a restraining cam including a friction reduction means interposed between the restraining cam and the star-wheel.

It is another object to provide in a Geneva mechanism including a star-wheel having a plurality of radially extended drive slots and a driver including a restraining cam for temporarily restraining the star-wheel in rotation, a plurality of anti-friction rollers for substantially eliminating effects of friction at the point of greatest stress developed between the adjacent surfaces of the restraining cam and the star-wheel.

These and other objects and advantages are readily achieved by mounting a pair of anit-friction rollers near the adjacent ends of an excurvated segment of the cam surface of a restraining cam for sequentially engaging the adjacent incurvated segments of a cam-follower surface, at points of greatest stress, whereby effects of friction are overcome, as will become more readily apparent by reference to the following description and claims in light of the accompanying drawings.

DESCRIPTION OF THE PREFERRED EMBODIMENT

Figure 1:
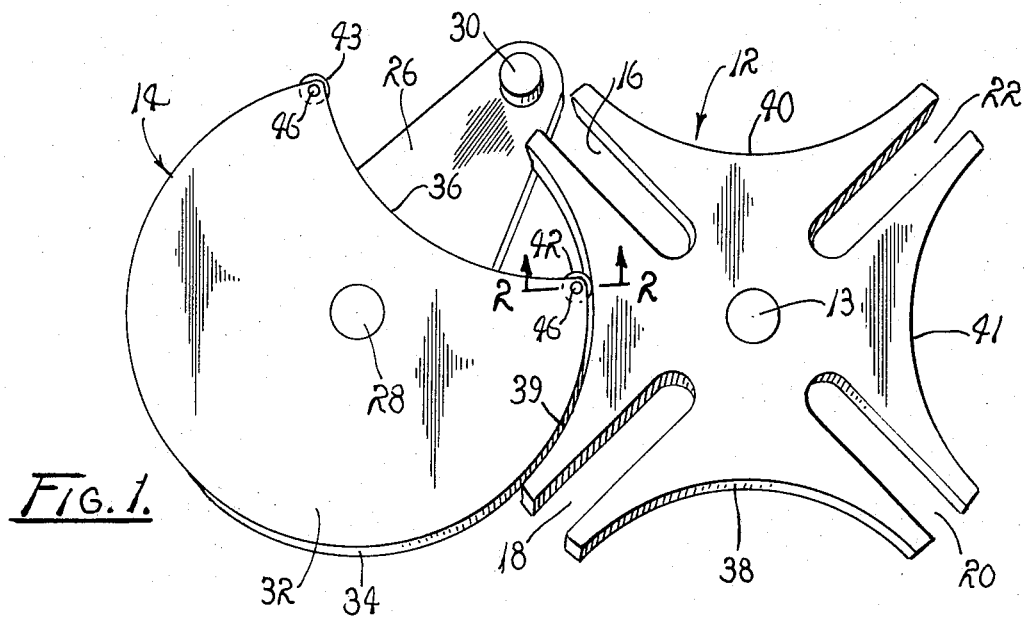
FIG. 1 is a perspective view of an improved Geneva mechanism which embodies the principles of the instant invention, illustrating an operative disposition for a driven star-wheel and a star-wheel driver.
Figure 2:
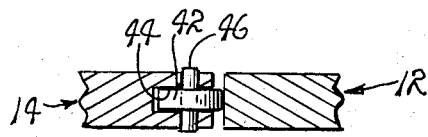
FIG. 2 is a fragmented cross-sectional view taken generally along line 2—2 of FIG. 1.

Referring now to the drawings wherein like reference characters designate like or corresponding parts throughout the several views, there is shown in FIG. 1 a Geneva mechanism which embodies the principles of the instant invention.

The Geneva mechanism illustrated in FIG. 1 includes a star-wheel 12 mounted on an idler shaft 13, and a driven star-wheel driver 14 for indexing the star-wheel. The star-wheel 12 is a biased star-wheel having a load applied to the shaft 13 in the direction in which it operatively is advanced by the star-wheel driver 14. Such a condition frequently exists where the star-wheel 12 is coupled with a body strained within its elastic limits, so that a restoring torque is applied to the shaft 13.

In order to impart an indexing motion to the star-wheel 14, the star-wheel is provided with a multiplicity of radially extended coupling slots, designated 16 through 22. The number of slots employed may be varied as desired. While only four slots spaced 90° apart are shown, it should be apparent that six slots spaced 60° apart can be employed equally as well. The star-wheel driver 14 includes a driver arm 26 rigidly affixed to a drive shaft 28 through which rotary motion to the star-wheel is imparted. A stub-shaft 30 is affixed to the driver arm 26 at the distal end thereof and is caused to describe a circular path as the shaft 28 is rotated. The stub-shaft 30 preferably is of a cylindrical configuration and includes a plane bearing surface configured to be received, in sequence, by the coupling slots 16 through 22 as continuous rotary motion is imparted to the shaft 28 for continuously advancing the driver arm 26.

In order to support the star-wheel 12 in a position such that the coupling slots 16 through 22 are caused to become aligned in sequence within the circular path of the stub-shaft 30, a restraining cam 32 is rigidly mounted on the shaft 28 in juxtaposition with the driver arm 26 and supports the star-wheel against rotation. The restraining cam 32 is provided with a segmented cam surface, including an excurvated segment 34 having a length of approximately 270° and an incurvated segment 36 having a length of approximately 90°, where only four slots are employed. Of course, where six slots are employed, the excurvated segment has a length of 300°, while the incurvated segment has a length of only 60°. The excurvated segment 34 has a radius of curvature equal to the major diameter of the restraining cam 32, while the incurvated segment 36 has a radius of curvature substantially equal to the major diameter of the star-wheel 12.

The star-wheel 12, in turn, includes a segmented cam-follower surface including a plurality of uniform incurvated segments designated 38 through 41, terminating at points located adjacent to the coupling slots 16 through 22. The surfaces of the incurvated segments serve as cam-follower surfaces and sequentially engage the surface of the excurvated segment 34 of the restraining cam 32.

Mounted on the restraining cam 32, at the intersections of the segments 34 and 36, there is a pair of anti-friction rollers, designated 42 and 43, which project from the peripheral surfaces of the restraining cam 32. These rollers sequentially engage the adjacent surface segments 38 through 41 and serve to eliminate sliding friction therebetween, whereby relative motion between the restraining cam 32 and the star-wheel 12 is accommodated. Of course, the anti-friction rollers 42 and 43 are of any suitable design. However, as shown, each of the rollers preferably is seated in an appropriately formed slot 44 and is mounted on a bearing pin 46 extended through the adjacent portions of the cam to provide an axis of rotation normally related to the plane of the face of the cam.

It should therefore be apparent that as the drive shaft 28 is driven in rotation, the surface of the excurvated segment 34 of the restraining cam 32 is permitted to advance along the surface of an incurvated segment of the star-wheel 12, in engagement therewith, while the star-wheel is thereby restrained against rotary motion for maintaining one of the coupling slots 16 through 22 within the path of the stub-shaft 30. As can be appreciated, once the stub-shaft 30 is introduced into a coupling slot, continued motion imparted to the stub-shaft causes the stub-shaft to act against the surface of the coupling slot for indexing the star-wheel in angular displacement.

Where a load is applied to the shaft 13, the star-wheel is biased for rotation in response to the applied load. Accordingly, where the load is applied to the shaft 13 in the same direction in which the star-wheel is indexed by the star-wheel driver 14, there is a distinct tendency for the star-wheel to overrun the star-wheel driver. This condition occurs as the intersection of the excurvated segment 34 and the incurvated segment 36 approaches an imaginary line extending between the axes of rotation for the shafts 13 and 28 and results from the fact that the star-wheel 12 is permitted to advance ever so slightly ahead of the star-wheel driver, under the influence of the applied load. Such motion causes point-contact to be established between the contiguous surface of the segments of the star-wheel and the star-wheel driver. Unless relative motion between the contiguous surfaces is accommodated, the restraining cam 32 and the star-wheel 12 freeze together.

It is important here to note, however, that the anti-friction rollers 42 and 43 experience rolling motion along the surfaces of the segments 38 through 41 for thus obviating a "freezing" of the restraining cam to the star-wheel. Thus, the restraining cam 32 is permitted to continue to rotate for advancing the surface 34 along the surface of the adjacent segment of the cam-follower surface. Of course, once the anti-friction rollers 42 and 43 advance beyond the aforementioned imaginary line which extends between the shafts 13 and 28, a reduction in stress between the contiguous surfaces of the restraining cam and the star-wheel rapidly decreases, as clearly illustrated in FIG. 6.

OPERATION

It is believed that in view of the foregoing description, the operation of the device will readily be understood and it will be briefly reviewed at this point.

With the Geneva mechanism assembled in the manner hereinbefore described, the operation thereof can readily be appreciated by noting the sequential positional relationships established between the restraining cam 32 of the star-wheel driver 14 and the star-wheel 12.

Figure 3:
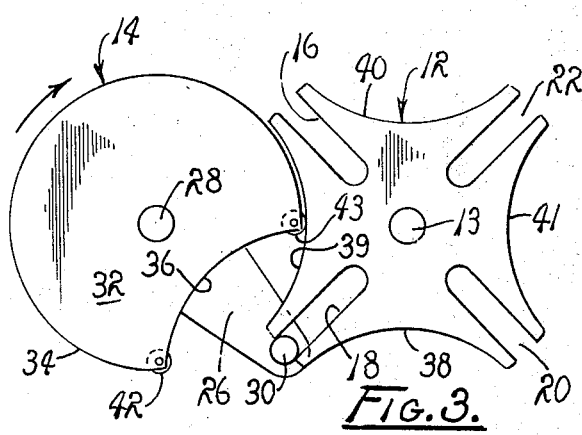
FIGS. 3 through 6 are plan views of the Geneva mechanism, illustrating an operational sequence therefor.

Turning first to FIG. 3, it is assumed that the roller 43 is in engagement with the surface segment 39 and that the star-wheel 12 therefore is quiescent. It is further assumed that a load, not shown, is applied to the shaft 13 through which the star-wheel is biased for continuous rotation in the direction in which it previously was advanced, just prior to coming to rest. The quiescent condition is maintained so long as the star-wheel is supported against rotation by the segment 34 of the restraining cam 32.

Figure 4:
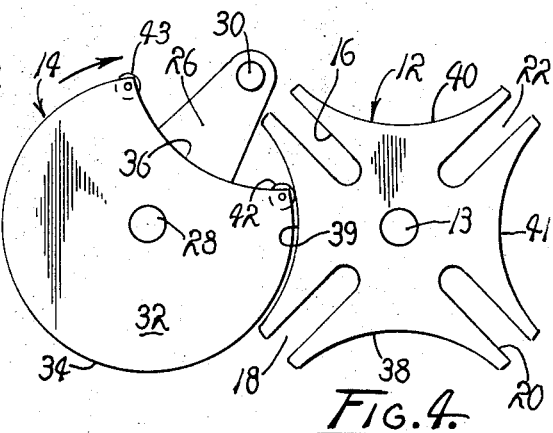
Figure 5:
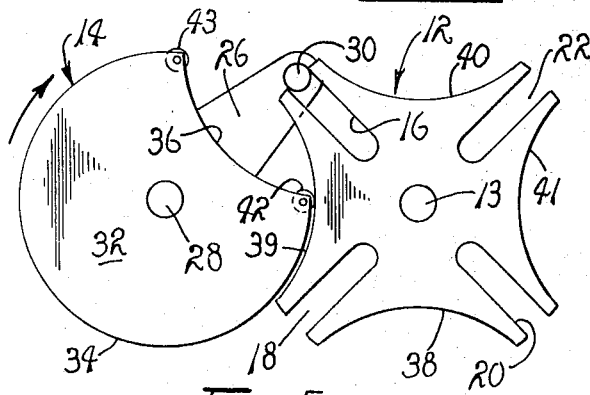
Figure 6:
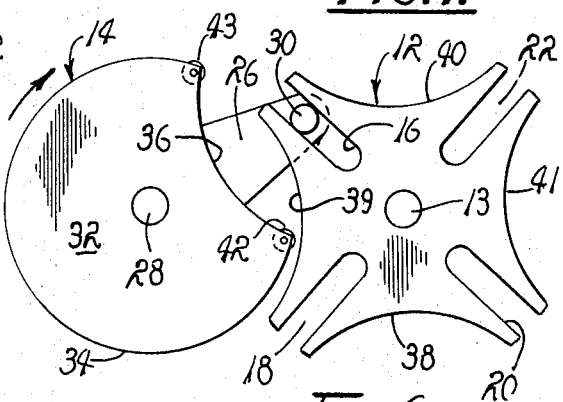

As shown in FIG. 4, continued rotation of the cam 32 causes the segment 34 to advance sufficiently for positioning the roller 42 in close proximity with the aforementioned imaginary line extending between the centers of the shafts 13 and 28. When in a position approximate to that illustrated in FIG. 4, the load applied to the star-wheel 12 serves to initiate rotation of the star-wheel, for thereby rapidly increasing the stress between the surface of the anti-friction roller 42 and the adjacent incurvated segment 39 of the cam-follower surface. The roller 42, of course, is permitted to roll along the adjacent segment of the cam-follower surface until the roller is brought into alignment with the shafts 13 and 28. At approximately this instant, as best illustrated in FIG. 5, the stub-shaft 30 enters the coupling slot 16. Continued rotation of the restraining cam 32 causes the roller 42 to cross the imaginary line whereupon the roller 42, as illustrated in FIG. 6, disengages the segmented cam-follower surface. Of course, rotary motion of the star-wheel 12 continues under te influence of the applied load and under the dictates of the driver arm 26 until the roller 43 engages the surface 40 and the stub-shaft 30 is extracted from the slot 16. Due to the inherent tendency of the anti-friction roller 43 to roll along the surface segment 40, engaged therewith, advancement of the segment relative to the surface segment 40 is accommodated. Such continues until the roller 43 passes through the aforementioned imaginary line. At approximately this instant, sliding engagement of the surface 34 with the segment 40 is established. However, the area of contact for the engaged surfaces is sufficiently great to accommodate a sliding engagement thereof for avoiding any tendency to freeze.

In view of the foregoing, it shouwl readily be apparent that the present invention provides a practical solution to the perplexing problem of avoiding a "freezing" of the restraining cam to the surface of the star-wheel in a Geneva mechanism, particularly where the star-wheel is biased in the same direction which it is indexed by the star-wheel driver.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. In a Geneva mechanism characterized by a star-wheel having a plurality of uniformly disposed, radially extended drive slots and a segmented cam-follower surface including a plurality of uniform, incurvated segments interposed between the drive slots, and a star-wheel driver comprising a driving arm and a juxtaposed restraining cam having a segmented cam surface contiguously related with the segmented cam-follower surface and including an excurvated segment having a radius of curvature substantially equal to the radius of the incurvated segments of said cam-follower surface for sequentially engaging segments of the cam-follower surface, the improvement comprising:
   friction reduction means interposed between the cam surface and the cam-follower surface adjacent to each end portion of said excurvated segment of the cam surface.

2. The improvement of claim 1 wherein said friction reduction means includes a pair of anti-friction rollers pinned to said restraining cam for engaging the segments of said cam-follower surface.

3. The improvement of claim 2 wherein said star-wheel is further characterized by being biased in the direction of said angular displacement.

4. A Geneva mechanism comprising:
   a. a star-wheel having a plurality of radially extended drive slots and a segmented cam follower surface including uniformly incurvated segments;
   b. a star-wheel driver for imparting incremental angular displacement to the star-wheel having a driving arm affixed to a drive shaft, a stub shaft disposed at the distal end of the driving arm for sequential insertion into the drive slots of said star-wheel, and a restraining cam having a segmented cam surface disposed in juxtaposition with the star-wheel, including an excurvated segment having a radius of curvature substantially equal to the radius of curvature of the incurvated segments, and an incurvated segment extended between the opposite ends of said excurvated segment having a radius of curvature greater than the greatest radius for said star-wheel; and
   c. friction reduction means including an anti-friction roller pinned to said restraining cam near each of the opposite ends of said excurvated cam surface for engaging the incurvated segments of said cam follower surface.

* * * * *